United States Patent [19]

Donnini et al.

[11] Patent Number: 4,676,704
[45] Date of Patent: Jun. 30, 1987

[54] APPARATUS TO MAKE THE CROSSWISE MOVEMENT OF THE TOOLHOLDER SLIDE MOUNTED ON THE SPINDLE OF A TOOL MACHINE AUTOMATIC DURING THE CUTTING MOTION

[75] Inventors: Giovanji Donnini; Giuliano Fantini, both of Florence, Italy

[73] Assignee: Bakuer Italiana S.p.A., Italy

[21] Appl. No.: 739,569

[22] Filed: May 30, 1985

[30] Foreign Application Priority Data

[IT] Italy ...................................................

[51] Int. Cl.⁴ ............................................. B23B 29/03
[52] U.S. Cl. ...................................... 409/208; 82/1.2; 82/2 E; 409/215; 409/232
[58] Field of Search ...................... 408/4, 8, 11, 10, 13, 408/147; 409/183, 190, 191, 193, 204, 207, 208, 210, 211, 215, 232, 234; 29/568; 82/112, 115, 2 E, 2 B; 339/40, 64 R, 64 M, 65, 66

[56] References Cited

U.S. PATENT DOCUMENTS

| | | | |
|---|---|---|---|
| 2,331,255 | 10/1943 | West ................................ | 339/64 R |
| 2,528,014 | 10/1950 | Moses, Jr. et al. .................. | 339/40 |
| 3,070,770 | 12/1965 | Mercier ............................ | 339/64 R |
| 3,169,416 | 2/1965 | Carlson et al. .................... | 408/181 X |
| 3,710,659 | 1/1973 | Pagella et al. ..................... | 82/2 E X |
| 3,740,160 | 6/1973 | Kimura et al. ..................... | 408/13 X |
| 3,744,352 | 7/1973 | Scholl .............................. | 82/2 E X |
| 3,982,806 | 9/1976 | Wilson et al. ...................... | 339/64 R |
| 4,328,722 | 5/1982 | Wohlhaupter et al. ............... | 82/2 E |
| 4,489,629 | 12/1984 | D'Andrea et al. ................... | 82/1.2 |

Primary Examiner—Gil Weidenfeld
Assistant Examiner—Glenn L. Webb
Attorney, Agent, or Firm—McGlew and Tuttle

[57] ABSTRACT

An apparatus for connection to a machine tool having a rotating head and a fixed part is capable of automatically moving a cutting tool radially while a spindle carrying the cutting tool rotates. The apparatus includes a body which is engageable to the tool machine so as to remain fixed with respect to a central axis. A spindle is rotatably mounted to the body and is connected to the head of the tool machine for rotation. A slide holder is fixed to the spindle and carries a toolholder for sliding movement in a radial direction with respect to the central axis. An electric motor is mounted in the non-rotating body and drives a gear train which can radially move the toolholder while the spindle, slide holder and toolholder rotate. A position transducer is engaged with the electric motor for determining its position and thus the position of the toolholder on the spindle. A connector is provided for automatically electrically connecting the motor and transducer to a control unit of the tool machine when the apparatus of the invention is engaged with the tool machine.

6 Claims, 10 Drawing Figures

4,676,704

APPARATUS TO MAKE THE CROSSWISE MOVEMENT OF THE TOOLHOLDER SLIDE MOUNTED ON THE SPINDLE OF A TOOL MACHINE AUTOMATIC DURING THE CUTTING MOTION

FIELD AND BACKGROUND OF THE INVENTION

The present invention relates in general to machine tools having a spindle carried on the toolholder, and in particular to a new and useful apparatus for automatically moving a toolholder slide which carries the spindle transversely to an axis of the spindle during cutting motion of a tool carried on the spindle.

SUMMARY OF THE INVENTION

The present invention is for use with a machine tool for the automatic radial displacement of a toolholder mounted on a spindle of the machine tool.

A slide holder is connected to the spindle for rotation therewith. The slide holder is mounted for sliding on a toolholder in the direction transverse to the axis on which the spindle rotates. An epicyclic gear train is engaged between the slide holder and the toolholder and is operated by a DC electric motor mounted on the slide holder. The motor rotates a screw gear which is meshed with the helical gear forming part of the epicentric gear train. A position or space transducer is connected to the electric motor for producing a signal corresponding to the position of the motor. Electrical connections of the transducer and motor are effected by a connector which automatically engages and automatically disengages the motor and transducer when the toolholder is connected or disconnected from a machine tool.

The advantages obtained through the invention consist mainly in that it is possible to achieve the continuous and constant traversing speed of the toolholder-slide in the radial direction to the spindle axis, its reciprocating rectilinear movement and its stopping at any point of its travel with the possibility to detect dimensional errors on the x and y axes by correcting them on the U axis of the apparatus. This permits the performance of facing, boring, external/internal turning, and threading operations. This also permits the in sequence formation of a plurality of holes even of different diameters with the same tool by operating on the correct U axis which means a reduction of the in-stock tools. An interactive and sequential working of the machining center can also be performed by means of the control unit which allows interpolation suited for the working of extremely complex parts thanks to the simultaneous and continuous movement of four axes, with the possibility of recovering motion loss which take place on stepless works with reversal of the motion direction. Advantageously, the connector presents a low ohmic resistance, a low specific amperometric load, a low specific pressure, slight wear, a great number of manoeuvres, and robust contacts without positive restraints, further presenting a high protection against dirt and acting as a stop-block.

These and other advantages and features of the invention will be better understood by anyone skilled in the art through the following description in conjunction with the attached drawings which show a practical embodiment of the invention not to be considered in a limitative sense.

DESCRIPTION OF THE PREFERRED EMBODIMENT

Figure 1:
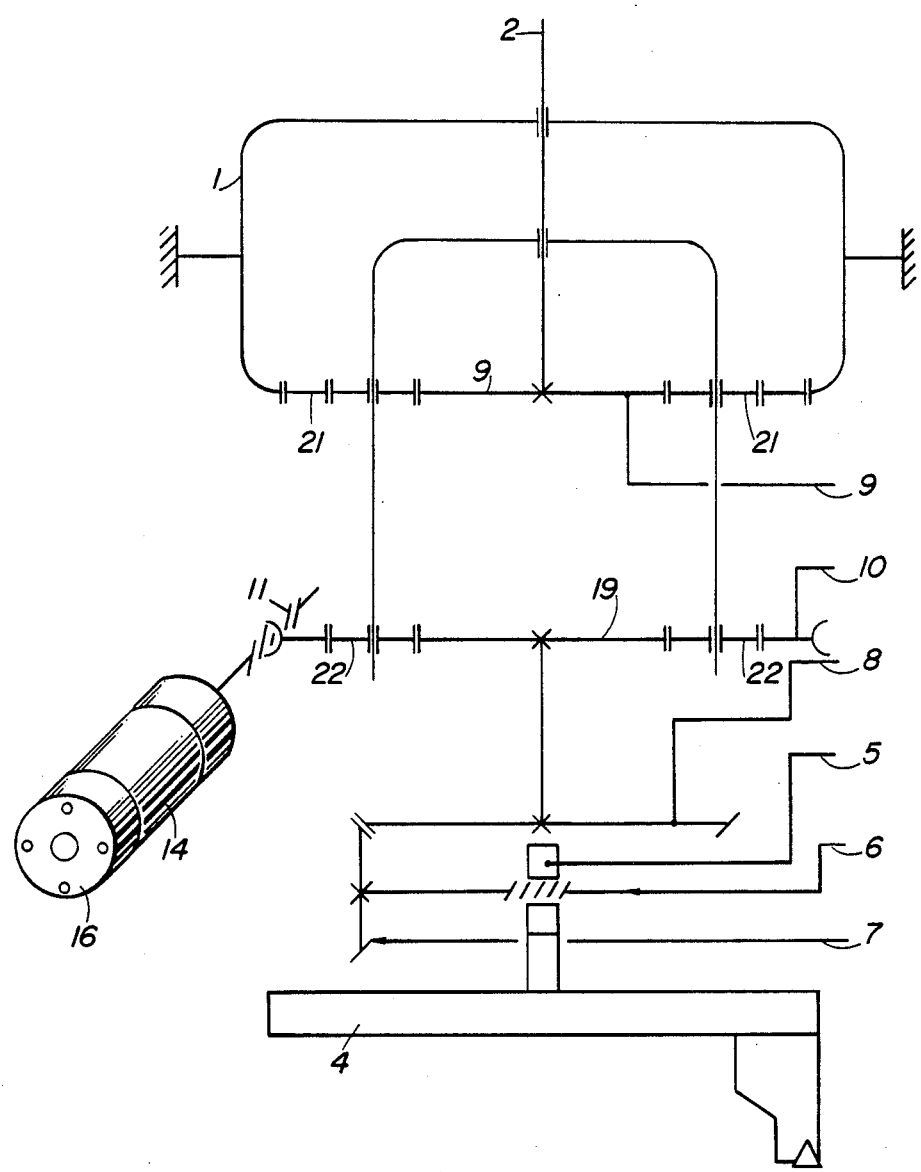
FIG. 1 shows diagramatically the apparatus according to the invention.
Figure 2:
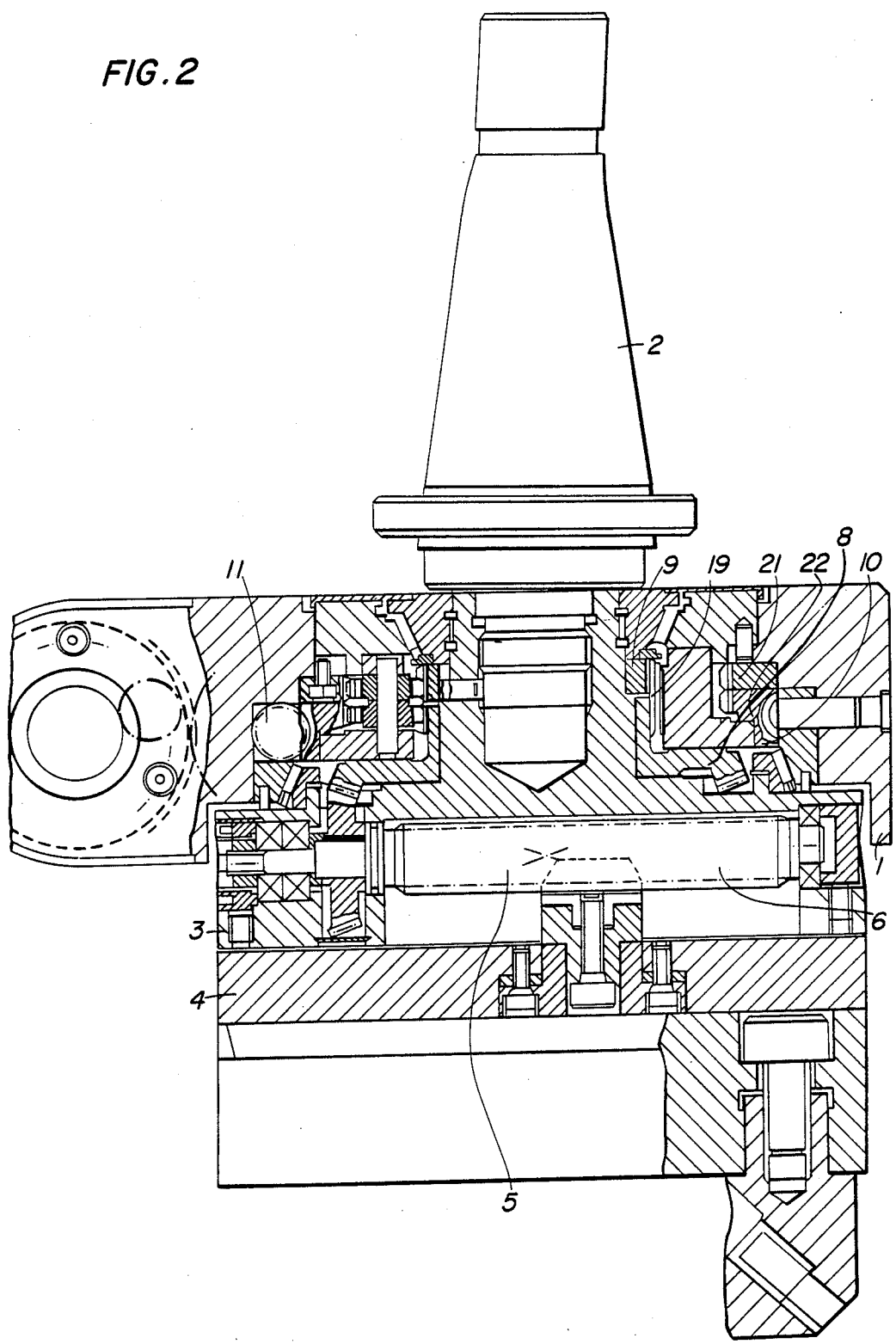
FIG. 2 shows a longitudinal front section of an apparatus according to the invention.

Reduced to its essential structure and with reference to FIG. 1, an apparatus for the automatic movement of a toolholder-slide mounted on a spindle of a tool machine, during cutting motion, according to the invention includes a body 1 which is connected to and machine bed and which has no possibility for rotation. As shown in FIG. 5, a rod 32 is provided for the opening of a shield 29 of a connector (as will be explained in the following). The apparatus as shown in FIGS. 1 to 4, has a toolholder 3 integral with a cone 2 for coupling to a spindle or female member 20 of the machine (FIG. 5), with an epicyclic train 9-21-22-19 of which the gear 19 operates, through gearing 8 and 7, a screw 6 which—with the interposition of a feed nut 5—actuates a slide 4 of the toolholder, with a helical gear 10 meshing with a gear 22 whose direction of rotation determines the directon of rotation for the screw 6. A d.c. electric motor 14 is anchored at the slide holder 3 which controls, through a gearing 13-12-11, the helical gear 10. A space (position) transducer 15 of digital signals type (Encoder) or analog signal type (Resolver) is linked with the electric motor 14 with the eventual addition of A speed transducer (speedometer dynamo). A CNC control unit which is external of the toolholder 3 is also used but for clarity sake it is not shown in the drawing. A connector 16 for the electrical connections of the motor 14, is also connected to transducer 15 and from these to the control unit of the apparatus of the machine. Connector 16 is shown in FIGS. 5 to 7D. The connector 16 includes a hollow component 28 integral to a steady part of the machine and coaxial to a female member 20 which member carries, inside thereof, a plurality of beryllium-copper plates arranged to form a crown and provided with a head T, these plates being inserted by a plurality of elastomer rings whose ends are connected to the terminals of the user conductors. In the center of this crown there is a centering pin 121 with a tange 23, the height of the pin exceeding that of the crown. A protective shield 29 is mounted on the component 28 and has a sector shape. Shield 29 rotates on pivots 30 and is provided with a peg 33 and kept closed (FIG. 7A) by a spring 31 acting towards the center axis of the pin 121. A hollow component 27 which is integral with the body 1 of the apparatus, can be fitted into the component 28 and has a tubular member 118 concentric thereto, on the skirt of which there is a crown of beryllium copper plates 117 facing those 119 of the member 20. The cavity of the member 118 receives the central pin 121 and its circular base is fixed to the component 27 by means of a plurality of screws 24 with the interposition of two toric shaped elastomer rings 25 and 26 to allow the member 118 floating during the fitting of member 20.

It is noted that electric motor 14 has a rotatable shaft rotatable about an axis extending perpendicular to the central axis of the cone or spindle 2. The connector 16 as well as the cone 2 extend from a surface of the body 1 which is meant to face the machine tool. The connector 16 is radially spaced from the central axis of the spindle or cone and has a connecting axis along which the connector is movable, along with the body 1, for connection to the central equipment of the tool machine. This connecting axis is parallel to and radially spaced from the central axis of the spindle or cone 2.

Upon the assembling of the apparatus on the tool machine, in the rectilinear phase of the trajectory, the rod 32 intercepts the peg 33 thus opening the shield 29 before the fitting of components 27 and 28 (FIGS. 7A and 7B) takes place. Afterwards, the pin 121 operates the centering between the members 18 and 20 (FIGS. 7C and 7D) allowing them to become full inserted (FIG. 5).

Upon the disassembling of the apparatus, the reversal sequence takes place.

Figure 3:
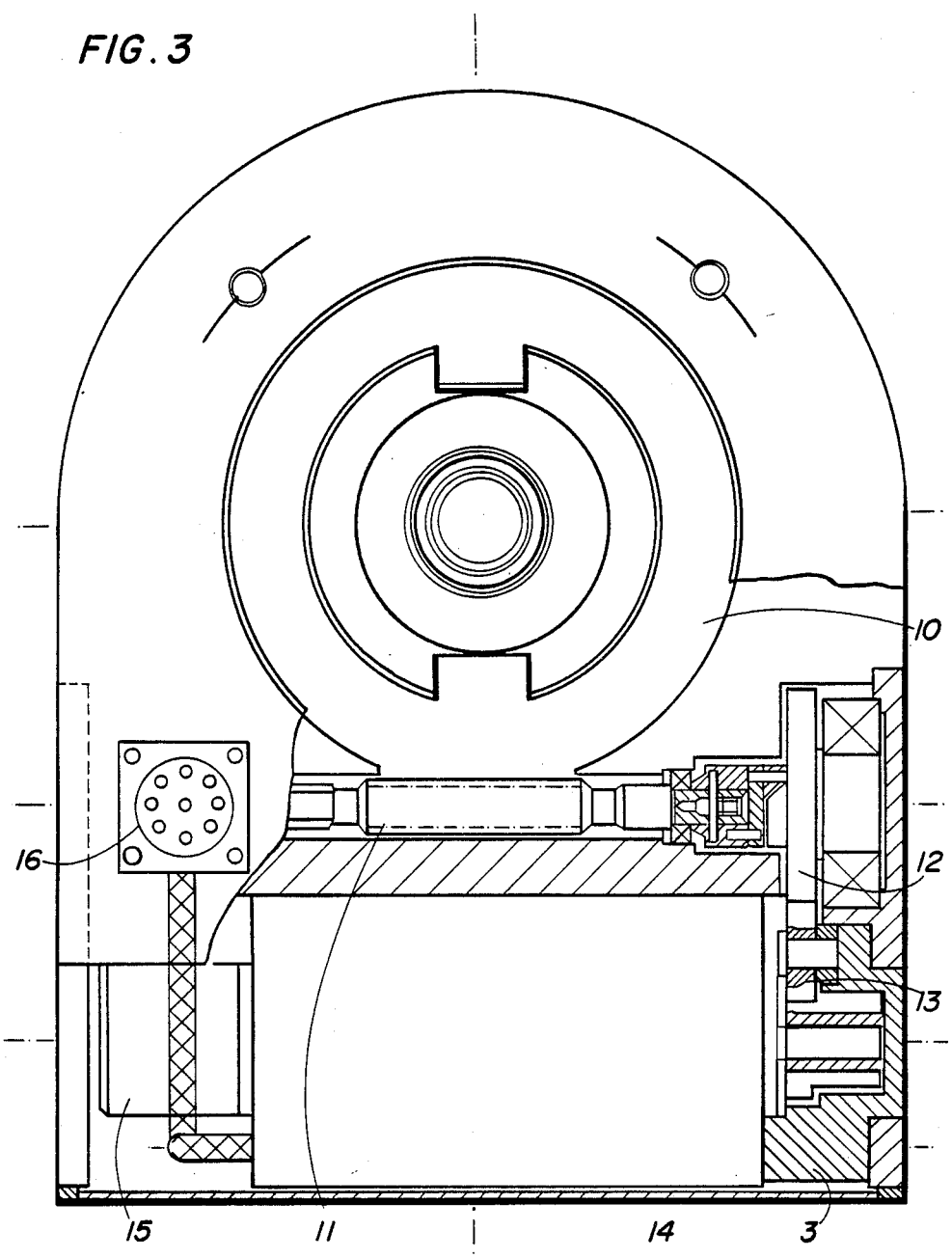
FIG. 3 shows a side longitudinal section of the apparatus of FIG. 2.
Figure 4:
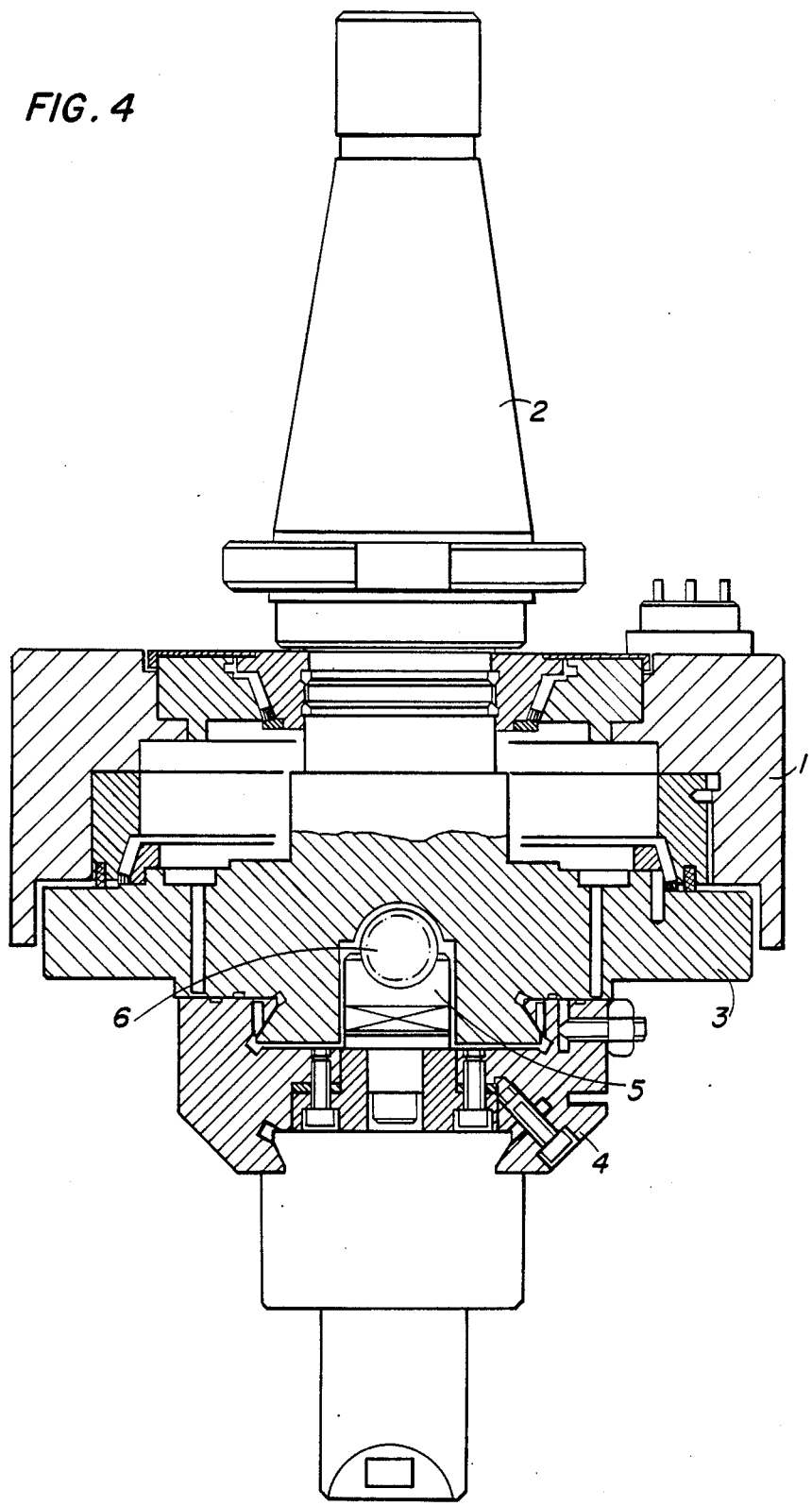
FIG. 4 shows a cross section of the apparatus of FIG. 2.
Figure 7C:
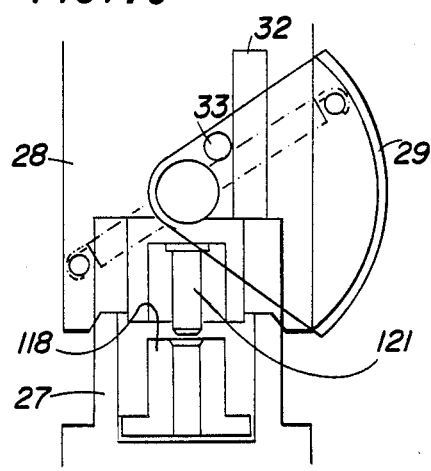
FIGS. 7A, 7B, 7C and 7D show the sequence of the phases for the closing of the connector.
Figure 7D:
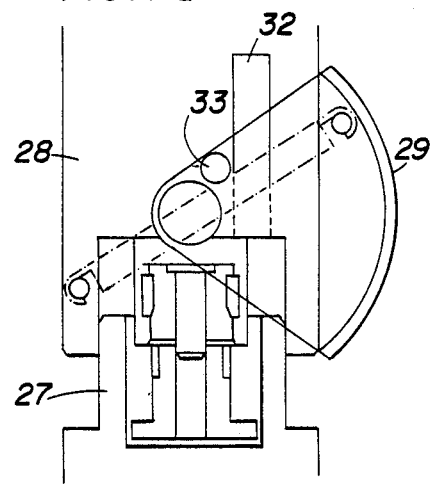
Figure 7B:
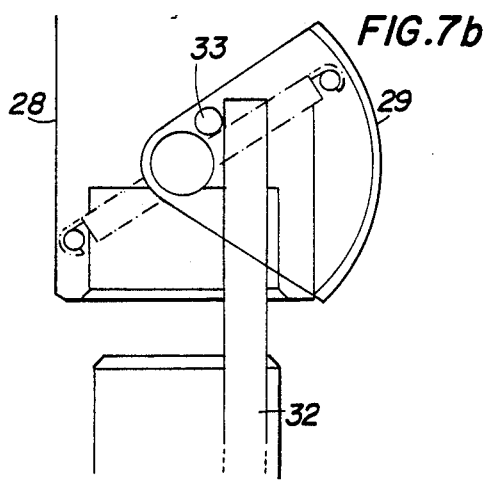
Figure 5:
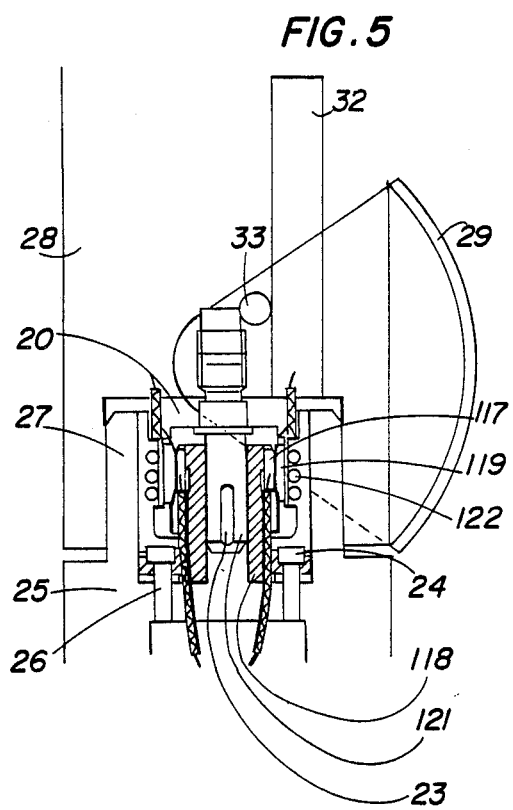
FIG. 5 shows in section the connector 16 in closed condition.
Figure 7A:
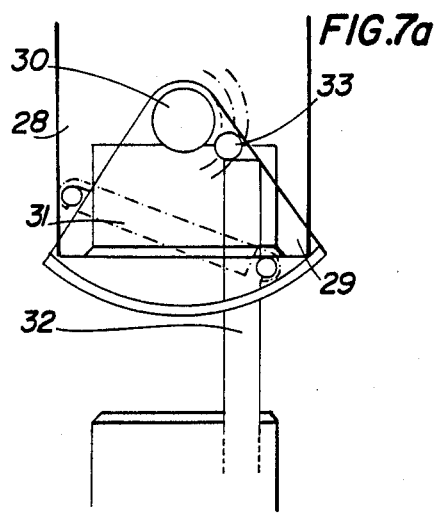
Figure 6:
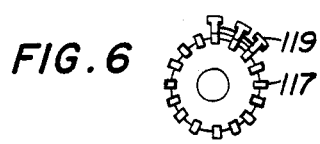
FIG. 6 shows in section the plates 17 and 19.

In operation, the inventive device as shiown in FIG. 4 is connected to the rotating head of a machine tool at spingle 2. At the same time body 1 is engaged with a non-rotating part of the machine. Toolholder 4 which is connected to the spindle 2 over slide holder 3 rotates along with the spindle 2 and carries a tool shown schematically in FIG. 1. By connecting the apparatus of the invention to the machine tool an automatic connection is made by the connector 16 which, as shown in FIGS. 3 and 4, is positioned for engagement and disengagement in a direction parallel to the rotational axis of the spindle to be rotated. The electric motor 14 is on the non-rotating body 1 and rotates spindle 11 which in turn rotates helical gear 10 shown in FIG. 2. This rotates the epicentric gear train having gears 21 and 22 and ending with a gear 9 fixed for rotation with the spindle 2. The epicentric gear train includes the ring gear 8 which meshes with a bevel gear 7 fixed to the spindle 6. Screw gear 6 is threaded into the feed nut 5. Rotation of the screw 6 thus moves toolholder 5 in the lateral direction with respect to the axis of spindle 2.

The conditions under which the apparatus may operate, once it has been mounted on the machine, are the following:

1. the machine has a control unit lacking in free axis (U axis) for controlling the radial movement of the toolholder; or
2. the machine has a control unit provided with additional axis (U axis) for controlling the radial movement of the toolholder.

In the first instance, an interface equipment will effect the connection between the machine and the control unit of the apparatus in which the CNC acts as auxiliary axis (U axis). It is then possible to carry out facings, borings, external and internal turnings, or cylindrical threads.

In the second instance, an interface equipment for the electric motor supply will be enough, while the control unit of the same machine will control the apparatus, thus allowing interpolation suitable for the working of extremely complex parts thanks to the simultaneous and continuous movement of four axes.

In order to point out the novelty that the apparatus according to the invention brings to the production technique in the machining centers, and exemplification of the specific characteristics of the invention follows.

It is well known that one of the major difficulties encountered in machining centers is the execution of bored holes with diameters in close tolerances, since the execution of the diameter depends on the adjustment of the cutter mounted on the boring bar. The omnidirectional sensor which may be part of the machine equipment but lacking in the apparatus of the invention, once it has detected the dimensional error of one hole can do nothing to correct it, and therefore, it is necessary, at this point, to draw a boring cutter out of stock and perform its adjustment on the suitable pre-setting apparatus and then reassemble the cutter on the machine and carry out the finishing touch of the bored hole.

On the contrary, in a machine provided with the apparatus of the invention, once the sensor has detected the error of the hole, the same sensor permits correction of the distance between centers as well as the diameter of the hole by using the same tool. How this is possible will be explained in the following. Keeping in mind that the crosswise movement of the toolholder 4 is called a "radial axis", "fourth axis" or "U axis", when the omnidirectional sensor detects a dimensional error upon the control of the hole, it can correct the radius of rotation of the tool directly on the machine by operating on the U axis.

The same principle permitting the correction of the dimension of the hole diameter by operating a microdisplacement of the tool, permits also, by operating a macrodisplacement of a suitably chosen tool, to perform, in sequence, a number of holes, even of different diameters. In this way it is no longer necessary to keep in stock a number of boring cutters equal to the number of different holes to be machined.

In practice, the details of construction may vary in equivalent ways with regard to form, dimensions, dispositions of the elements, materials employed without leaving the principles of the invention and thus remaining within the limits of the protection granted here.

We claim:

1. An apparatus for the automatic transverse movement of a cutting tool while it is rotated about a central axis by a tool machine, comprising:
   a body (1) adapted for non-rotational connection to a tool machine and having a surface for facing the tool machine;
   a spindle (2) adapted for connection to a rotating part of the tool machine, said spindle mounted for rotation to said body about the central axis and extending from said body surface;
   a slide holder (3) fixed to said spindle for rotation therewith about the central axis;
   a toolholder (4) slidably mounted to said slide holder for movement along a radial axis extending at an angle to said central axis;
   a direct current electric motor (14) mounted to said body, said motor having a rotatable shaft rotatable about a motor axis which is perpendicular to said central axis;
   a first worm gear (11) mounted for rotation to said body and engaged with said electric motor shaft for rotation of said first worm gear;
   epicyclic gear train means (9,21,22,19) connected to said slide holder;
   a helical gear (10) mounted to side slide holder and engaged between said first worm gear and said epicyclic gear train means for rotation of said epicyclic gear train means with rotation of said first worm gear by activation of said electric motor;

a second worm gear (6) rotatably mounted to said slide holder and engaged with said toolholder for movement of said toolholder along said radial axis with rotation of said second worm gear;

a gear pair (7,8) engaged between said epicyclic gear train means and said second worm gear for rotating said second worm gear with rotation of said epicyclic gear train means;

a transducer (15) linked to said electric motor for sensing a position of said electric motor which corresponds to a radial position of said toolholder on said slide holder; and a connector (16) electrically connected to said electric motor and to said transducer for connection thereof to control equipment of the tool machine for controlling movement of said toolholder along said radial axis, on said slide holder, said connector being disposed at said body surface at a location spaced radially from said central axis, said connector having a connecting axis along which said connector is movable along with said body, for connection to the control equipment, said connecting axis being parallel to and radially spaced from said central axis; said connector comprising a first hollow component (28) adapted for connection to a fixed part of the tool machine, a second hollow component (27) fixed to said body (1) and shaped for insertion into said first hollow component with connection of said body and said spindle to the tool machine, said components extending along said connecting axis; and said first hollow component (28) including a tubular concentric member (20) formed as a crown comprising a plurality of plates defining connection terminals, and a centering pin (121) lying on said connecting axis, connected to said first hollow component and centered within said tubular concentric member (20) having the length parallel to said central axis greater than that of said tubular concentric member, and a orientation tang (23) connected to and extending from said centering pin.

2. An apparatus according to claim 1, wherein said second hollow component (27) comprises a concentric tubular member (118) having a skirt forming a crown made of a plurality of plates (117) juxtaposable and engageable with said plates (119) of said first hollow component (28), said concentric tubular member (118) being insertable in an annular cavity defined between said tubular concentric member (20) and said centering pin (121) of said first hollow component, said plates (117) of said second hollow component having a cavity for receiving said tang (23) of said centering pin.

3. An apparatus according to claim 1, wherein said plurality of plates (119) forming terminals comprise at least one toric ring (122) and elastic material engaged with said ring for isolation thereof.

4. An apparatus according to claim 2, including a plurality of screws (24) connecting said concentric tubular member (118) to said second hollow component (27), and a plurality of toric rings made of elastic material engaged between said concentric tubular member (118) and said second hollow component (27).

5. An apparatus for the automatic transverse movement of a cutting tool while it is rotated about a central axis by a tool machine, comprising:

a body (1) adapted for non-rotational connection to a tool machine and having a surface for facing the tool machine;

a spindle (2) adapted for connection to a rotating part of the tool machine, said spindle mounted for rotation to said body about the central axis and extending from said body surface;

a slide holder (3) fixed to said spindle for rotation therewith about the central axis;

a toolholder (4) slidably mounted to said slide holder for movement along a radial axis extending at an angle to said central axis;

a direct current electric motor (14) mounted to said body, said motor having a rotatable shaft rotatable about a motor axis which is perpendicular to said central axis;

a first worm gear (11) mounted for rotation to said body and engaged with said electric motor shaft for rotation of said first worm gear;

epicyclic gear train means (9,21,22,19) connected to said slide holder;

a helical gear (10) mounted to said slide holder and engaged between said first worm gear and said epicyclic gear train means for rotation of said epicyclic gear train means with rotation of said first worm gear by activation of said electric motor;

a second worm gear (6) rotatably mounted to said slide holder and engaged with said toolholder for movement of said toolholder along said radial axis with rotation of said second worm gear;

a gear pair (7,8) engaged between said epicyclic gear train means and said second worm gear for rotating said second worm gear with rotation of daid epicyclic gear train means;

a transducer (15) linked to said electric motor for sensing a position of said electric motor which corresponds to a radial position of said toolholder on said slide holder;

a connector (16) electrically connected to said electric motor and to said transducer for connection thereof to control equipment of the tool machine for controlling movement of said toolholder along said radial axis, on said slide holder, said connector being disposed at said body surface at a location spaced radially from said central axis, said connector having a connecting axis along which said connector is movable along with said body, for connection to the control equipment, said connecting axis being parallel to and radially spaced from said central axis;

said connector comprising a first hollow component (28) adapted for connection to a fixed part of the tool machine, a second hollow component (27) fixed to said body (1) and shaped for insertion into said first hollow component with connection of said body and said spindle to the tool machine, said components extending along said connecting axis; and a shield (29) rotatably mounted to said first hollow component and movable between a closed position covering said first hollow component and an open position exposing said first hollow component for entry of said second hollow component, a spring (31) biasing said shield into its closed position, and means for automatically moving said shield into its open position with relative movement of said first and second hollow components along said central axis toward each other.

6. An apparatus according to claim 5, wherein said means for moving said shield into its open position comprise a peg (33) connected to said shield and a rod (32) connected to said second hollow component and movable into engagement with said peg for moving said shield into its open position with movement of said first and second hollow components together along said central axis.

* * * * *